US006202874B1

(12) United States Patent
Diamond

(10) Patent No.: US 6,202,874 B1
(45) Date of Patent: Mar. 20, 2001

(54) STORAGE APPARATUS FOR COMPUTER TOWER

(76) Inventor: George A. Diamond, 1974 Kenmore Dr., Grosse Pointe Woods, MI (US) 48236

( * ) Notice: Subject to any disclaimer, the term of this patent is extended or adjusted under 35 U.S.C. 154(b) by 0 days.

(21) Appl. No.: 09/354,368

(22) Filed: Jul. 14, 1999

(51) Int. Cl.[7] ................................................. B65D 21/02
(52) U.S. Cl. ............................ 220/4.03; 220/6; 220/476; 220/23.86; 220/694
(58) Field of Search ............................ 220/4.03, 6, 408, 220/476, 23.8, 694, DIG. 25

(56) References Cited

U.S. PATENT DOCUMENTS

| 2,108,300 | * | 2/1938 | Sullivan | 220/23.86 |
| 2,620,082 | * | 12/1952 | Harmon | 220/476 |
| 2,658,253 | * | 11/1953 | Richardson | 220/4.03 |
| 4,082,391 | * | 4/1978 | Turner | 220/476 |
| 4,227,759 | * | 10/1980 | Lee et al. | 220/DIG. 25 |
| 4,396,119 | * | 8/1983 | Giulie | 220/DIG. 25 |
| 5,080,452 | | 1/1992 | Tuckman | . |
| 5,392,913 | | 2/1995 | Merrick | . |
| 5,551,558 | * | 9/1996 | Bureau | 220/23.86 |
| 5,749,486 | * | 5/1998 | Porter | 220/23.86 |
| 5,875,912 | | 3/1999 | Hobson | . |
| 5,954,195 | * | 9/1999 | Krueger et al. | 220/23.86 |

* cited by examiner

Primary Examiner—Joseph M. Moy
(74) Attorney, Agent, or Firm—Brooks & Kushman P.C.

(57) ABSTRACT

A storage device assembly adapted for attachment to a computer tower housing has a pair of opposing side panels and includes a storage member having a main panel and at least one pair of opposing walls extending from the main panel defining therein a storage area for retaining objects therein. It also includes an attachment assembly which is coupled to the storage member. The attachment assembly has a pair of adjustable members. Each of the pair of adjustable members has side portions which engage a corresponding one of the pair of opposing side panels of the computer tower for retaining the attachment assembly thereto.

2 Claims, 12 Drawing Sheets

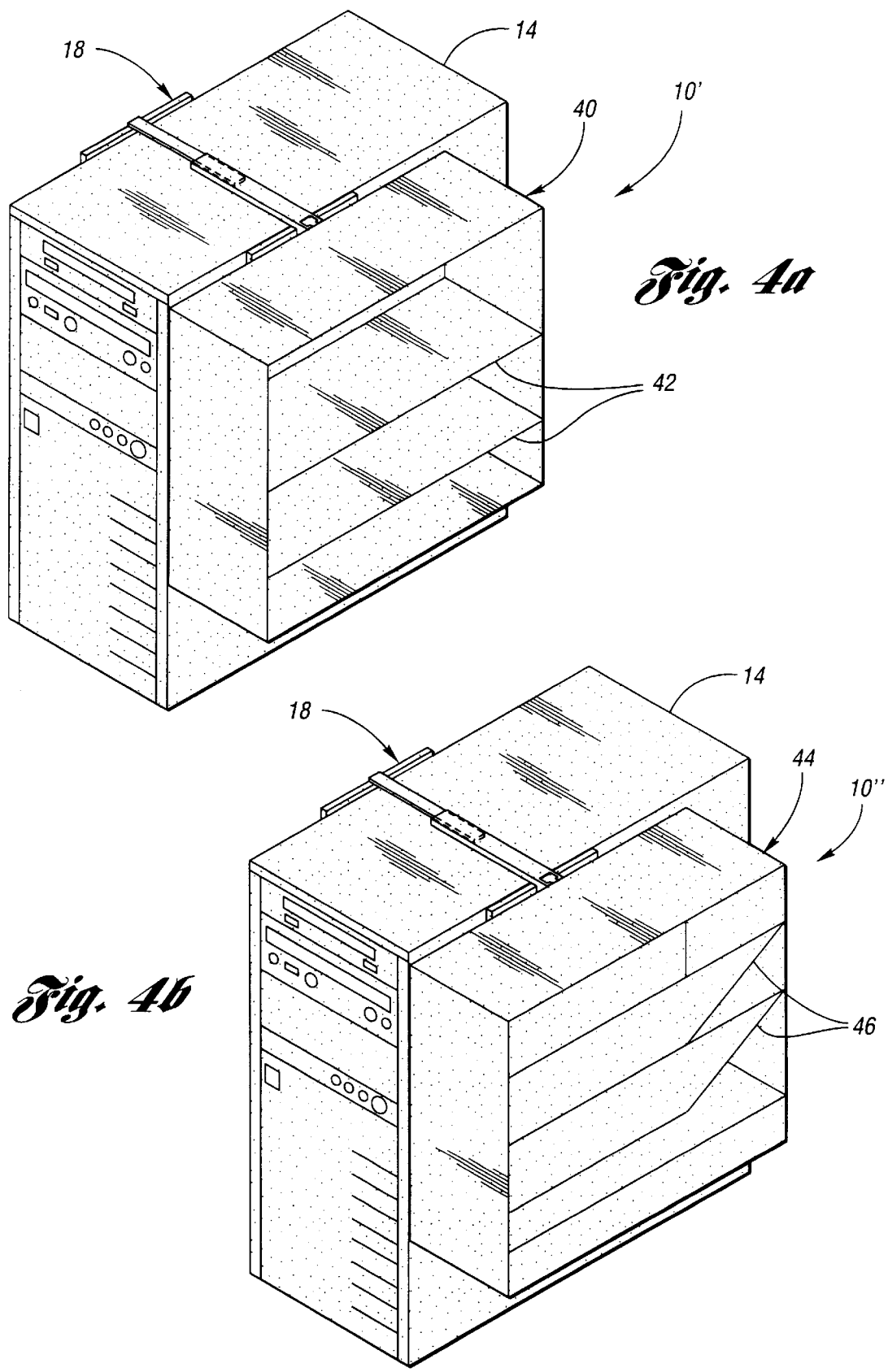

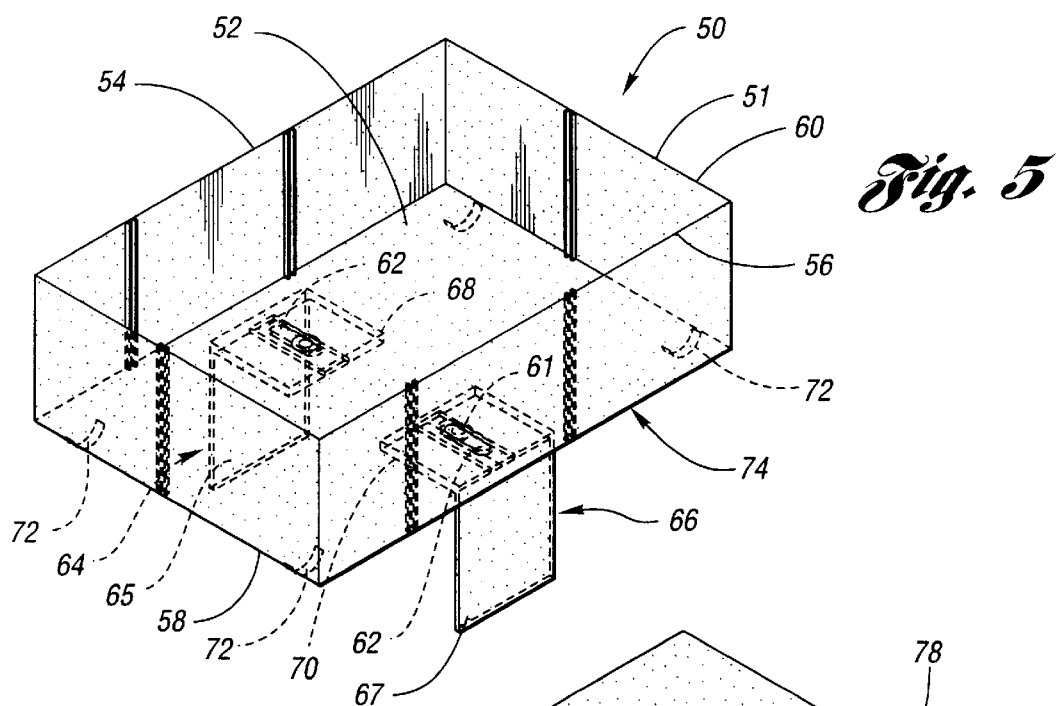
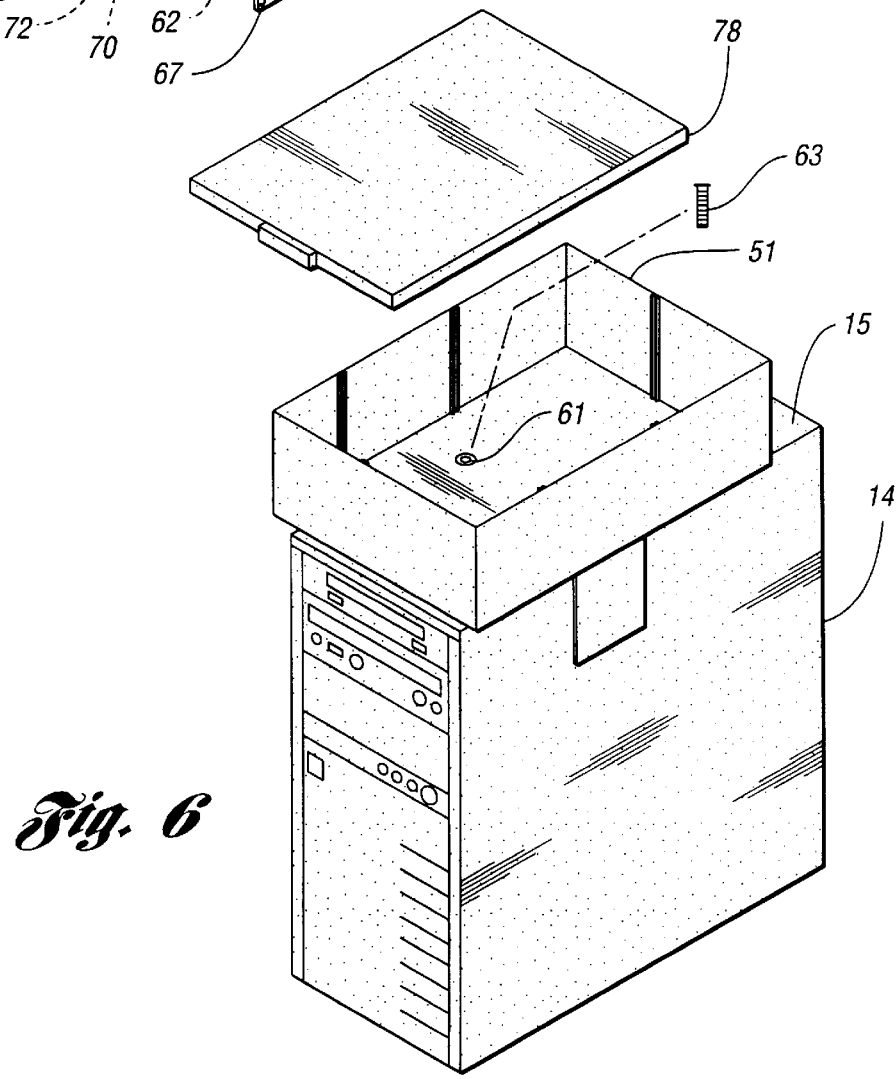

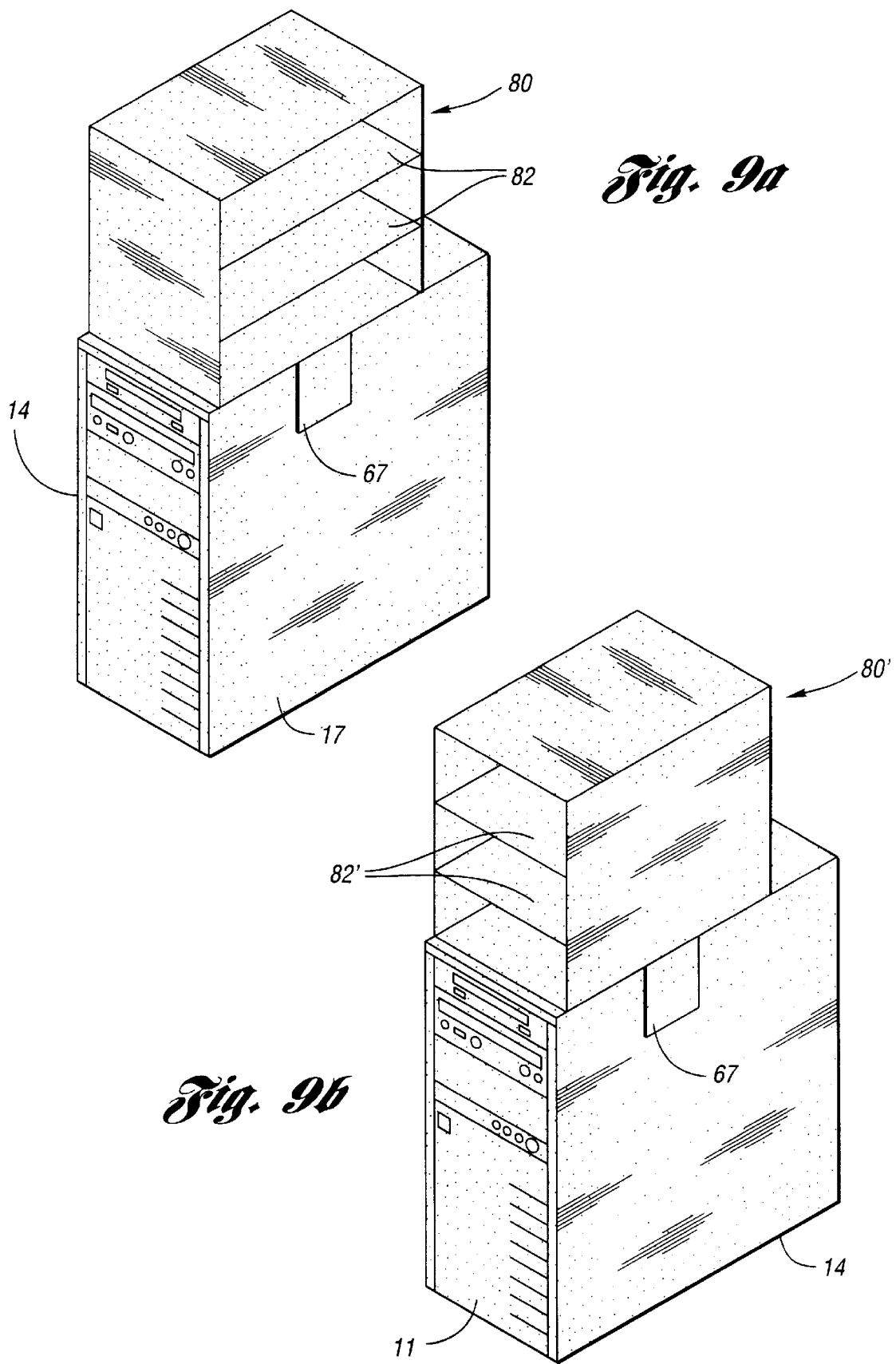

STORAGE APPARATUS FOR COMPUTER TOWER

TECHNICAL FIELD

This invention relates to a computer tower housing storage apparatus.

BACKGROUND ART

Work space is quickly becoming more of a premium both at the office and at home, due to the various equipment found on today's desks, including computers, monitors, keyboards and other items. Accordingly, there is less available space for individuals to store items such as papers, file folders, magnetic media, and the like in their work areas. As an alternative to their desktops, people tend to pile such items on the nearest possible surface, whether it be the floor, garbage can, or computer, as an extension of their work area. While such surfaces provide a temporary solution, in the long term, such spaces lack the stability of a typical desktop, or filing cabinet, and may be bumped into or knocked over by a user, a pet, or a vacuum cleaner, with negative results, and may cause damage to such items. Accordingly, there is a need for storage space adjacent or in the vicinity of a user's work area which provides for additional physical storage capacity in an organized and more stable fashion than that which currently exists.

Consequently, there exists a need for an extension of work or storage space, particularly in the office or home office setting. This work space extension should provide a stable, convenient, and efficient space to store and contain various items commonly found in the office. It should also be relatively inexpensive to manufacture and assemble.

DISCLOSURE OF INVENTION

It is an object according to the present invention to provide a storage space accessible to and conveniently located to a user's work area. is a further object according to the present invention to provide a storage apparatus adapted for an office which is relatively inexpensive to manufacture and assemble.

It is yet another object according to the present invention to provide a computer tower style housing having formed therein a place upon which various work items may be placed and organized, including papers, computer disks, CD ROMS, etc.

In keeping with the goals and objects according to the present invention, there is provided a storage device assembly which is adapted for attachment to a computer tower housing having a pair of opposing side panels. The storage device assembly includes a storage member which has a main panel or wall and a pair of opposing walls extending from the main panel defining therein a storage area for retaining objects. Also included is an attachment assembly which is coupled to the storage member. The attachment assembly includes a pair of adjustable members. Each of the pair of adjustable members has side portions for engaging a corresponding one of the pair of opposing side panels of the computer tower for retaining the attachment assembly thereto. In one embodiment, the at least one pair of opposing walls extends perpendicular from the main panel. In another embodiment, at least one shelving member extends from the main panel in order to divide the storage area. The shelving member may be oriented perpendicular to the main panel, or may be oriented at an angle in the range of 30° to 60° from the main panel.

In another embodiment, the pair of opposing walls extends from the main panel in a co-linear orientation. In still another embodiment, each of the pair of side portions has an opening therein for receiving a corresponding locking member mounted to each of the pair of opposing walls. Further, the pair of adjustable members may be slidingly received by the other of the pair of adjustable members. Each of the adjustable members includes a main portion perpendicular to the side portion, the main portion engages the main panel of the storage member. The attachment assembly is mounted to the main panel of the storage member.

In keeping with the present invention, further disclosed is a computer ower housing having a housing body portion which has a side panel and an upper panel. Also included is a storage portion having a main panel and first and second pairs of opposing storage panels which extend perpendicular from the main panel and define a storage area therein. The main panel is integrally defined by a one of the side panel and upper panel of the housing body portion. The computer tower housing may include a shelving member extending from the main panel for dividing the storage area. The shelving member may be oriented perpendicular to the main panel or at an angle in the range of 30° to 60° from the main panel.

The above objects and other objects, features, and advantages of the present invention are readily apparent from the following detailed description of the best mode for carrying out the invention when taken in connection with the accompanying drawings wherein like reference numerals correspond to like components.

BRIEF DESCRIPTION OF DRAWINGS

FIGS. 4a and 4b illustrate perspective views of a second and third embodiment, respectively, of the storage attachment device for the computer tower housing employing different styles of shelving;

FIG. 5 is a perspective view of a fourth embodiment of the attachment device illustrating in phantom the mounting mechanism;

FIG. 6 is a perspective view of the fourth embodiment of the storage attachment device for a computer tower housing according to the present invention, as shown in FIG. 5;

FIG. 9a is a fifth embodiment of the storage device according to the present invention having shelving members directed toward the side of the computer tower housing;

FIG. 9b is a sixth embodiment of the storage device according to the present invention having shelving directed toward the front of the computer tower housing;

BEST MODE FOR CARRYING OUT THE INVENTION

Figure 1:
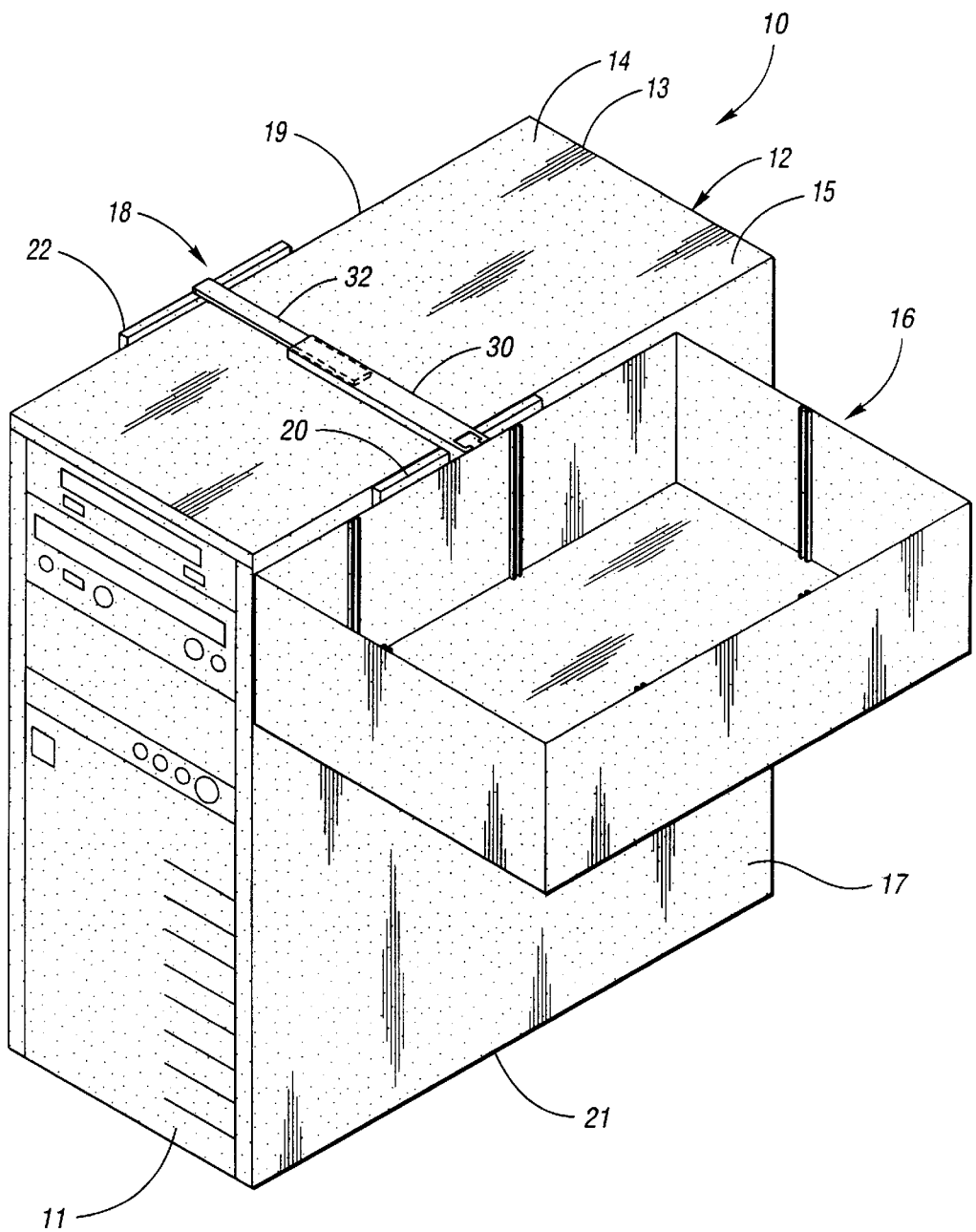
FIG. 1 is a perspective view of a first embodiment of the computer housing storage attachment according to the present invention attached to a computer tower housing.

In keeping with the teachings of the present invention, FIG. 1 of the drawings illustrates a first embodiment of the computer tower storage unit assembly 10 according to the present invention. Assembly 10 includes a computer central processing unit (CPU) tower 12 having a housing 14. As is well known in the art, computer tower housing 14 may have various names depending on its size. For example, computer tower housing 14 may also be referred to as a full tower, mid-tower or mini-tower, depending on its relative length, width and height. Housing 14 includes a front panel 11, a rear panel 13 disposed opposite front panel 13, and two opposing side panels 17, 19.

While these names for tower housing 14 are not completely standardized in the industry for corresponding measurements, they generally fall within the following ranges. The full tower typically has the following range of dimensions: 15.5–16.5 length, 6.825–7.5 width, and 24.25–24.5 height. The mid- (or midi-) towers generally have the following ranges of measurements: 15.5–16.5 length, 6.825–7.5 width, and 18–19 height. Lastly, minitowers have generally the following ranges of measurements: 13–16 length, 6.625–7.8 width, and 13–15 height. Note that all measurements are provided in inches). Again, many of these ranges may overlap because the sizes and ranges provided are not standardized in the industry. While the above ranges for housing 14 measurements are provided, the teachings according to the present invention are of course applicable to a tower housing 14 having dimensions falling outside of these ranges. Tower 12 may also be referred to as an upright CPU case.

Figure 2:
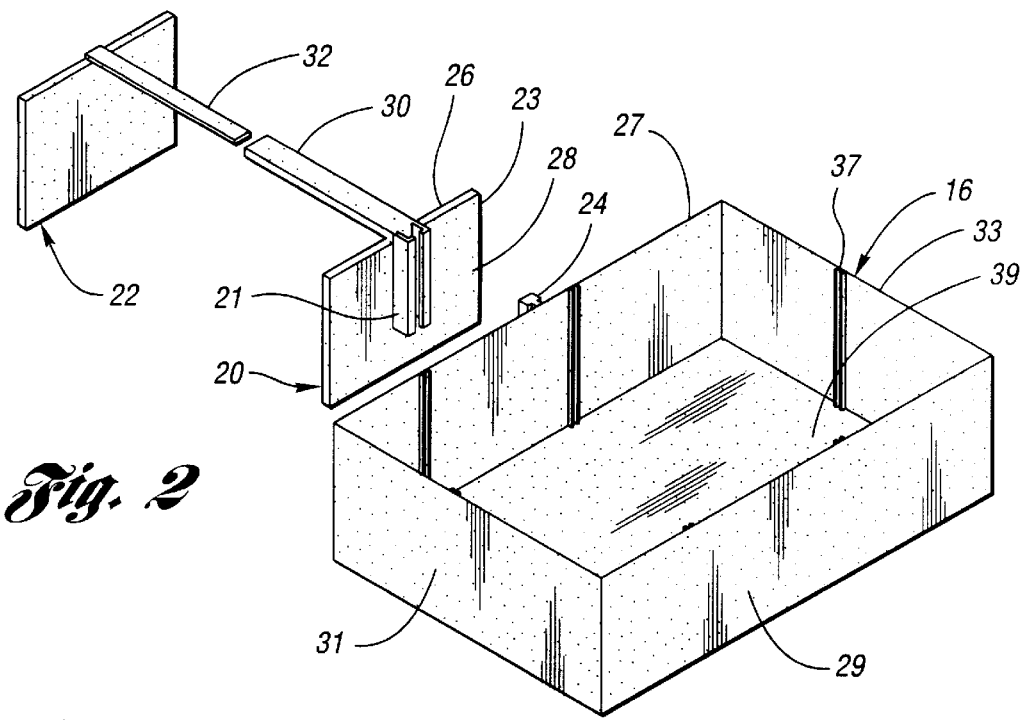
FIG. 2 is an exploded perspective view showing the various members included in the first embodiment of FIG. 1.

As illustrated in FIGS. 1–2, the first embodiment of storage unit assembly 10 includes a storage device or attachment 16 according to the present invention. Storage device 16 is preferably formed of a molded plastic or polymer material, but may be formed of any material suitable to the design and application. Storage device 16 is typically an assembly adapted for storing and containing various objects and goods and particularly those found in a work or home office setting. Such objects may include floppy discs, CD-Rom's, paper, files, books, etc.

Storage unit assembly 10 also includes an attachment mechanism 18 for removably mounting storage attachment 16 to housing 14. In the first embodiment of storage unit assembly 10 best shown in the exploded view of FIG. 2, attachment mechanism 18 includes a pair of interlocking mounting members 20 and 22. Attachment mechanism 18 may be formed of plastic, metal, or any other material suitable to the desired application and design.

As further illustrated in FIG. 2 and with reference to its operational characteristics as shown in FIG. 1, mounting member 20 has a panel portion 23 having two surfaces, an interior surface 26 adjacent computer tower 14 and an exterior surface 28 adjacent storage device 16. In operation, interior surface 26 is oriented adjacent housing side panel 17 (with reference to FIGS. 1 and 2) and exterior surface 28 is oriented adjacent side panel 27 of storage device 16. Exterior surface 28 of mounting member 20 has a first channel portion 21 provided thereon for receiving in a sliding manner a corresponding storage mounting member 24 included on the exterior surface of side surface 27 of storage device 16 (as shown in FIG. 1).

Figure 3:
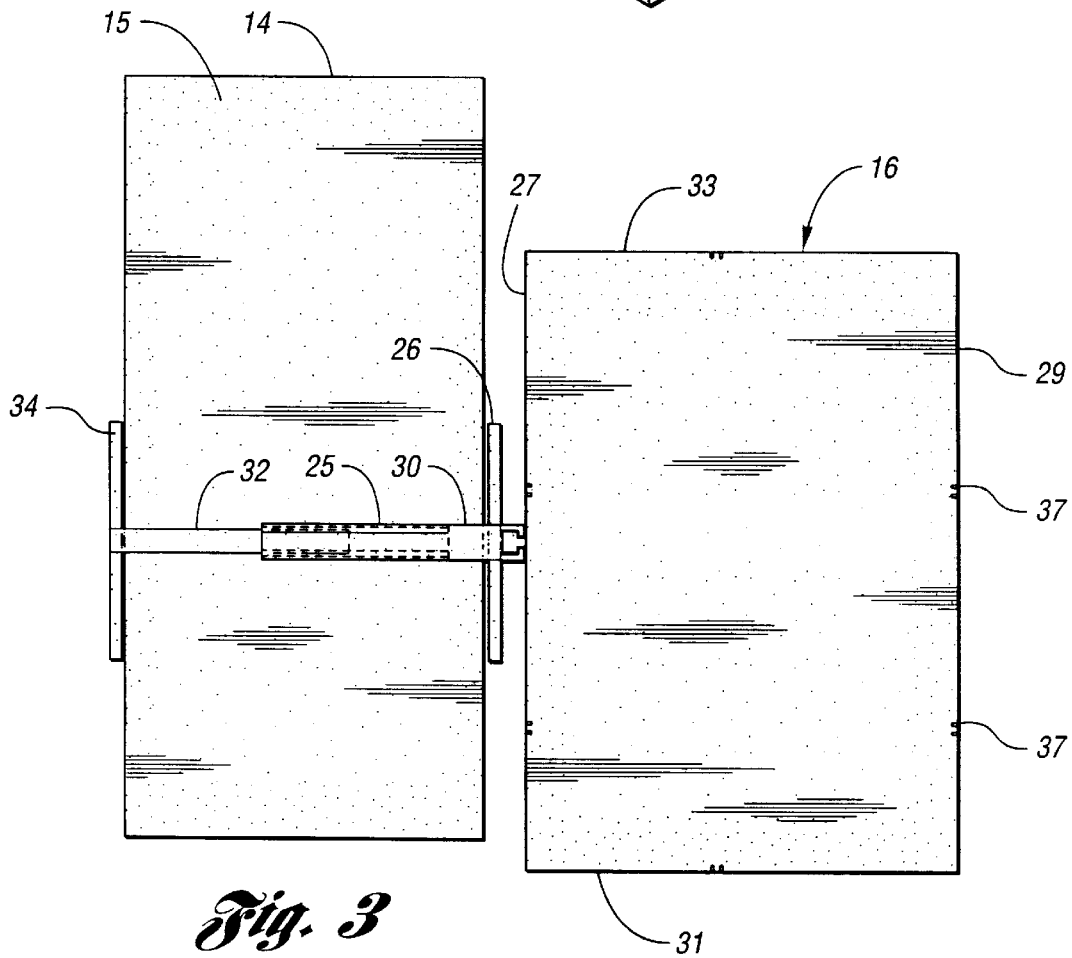
FIG. 3 is a top plan view of the first embodiment.

Mounting member 20 also includes a transverse portion 30 which, as shown in the top plan view of FIG. 3, has a channel 25 (shown in phantom) provided therein for receiving in an axially sliding manner a mating transverse portion 32 (partially shown in phantom) of attachment member 22. Thus, in operation, transverse member 30 is disposed adjacent computer tower upper surface 15. Mating mounting member 22 is similar to mounting member 20 but does not have the channels disclosed in association with mounting member 20. Mounting member 22 has a side oriented panel 34 disposed adjacent tower side and the aforementioned transverse portion 32 oriented perpendicular to panel 34 which is received within transverse portion 30 in channel 25 provided therein, as previously noted.

Accordingly, with reference to FIGS. 1 and 3, in operation, attachment mechanism 18 is designed to accommodate and be adapted to various sizes and proportions of computer tower housing 14. As shown in these figures, mounting members 20 and 22 slidably move via channel 25 and transverse portion 32, in relation to each other in order to accommodate various lengths and widths of computer tower housing 14. As further shown in FIG. 3, attachment panels 26 and 34 straddle computer tower housing 14 while storage compartment 16 is mounted and oriented along the side thereof.

As shown in FIGS. 2–3, storage compartment 16 includes four upstanding wall portions 27, 29, 31, 33, and a bottom panel 35 (main panel) defining a storage area 39 within. Storage compartment 16 also has inner surfaces having grooves 37 formed therein for receiving divider portions 36 (shown further herein). Accordingly, according to the present invention, dividers 36 may be received within grooves 37 in order to define within storage compartment 16 various subcompartments for storing any number of the objects contemplated according to the present invention.

FIG. 4a and FIG. 4b show two additional embodiments of storage unit assemblies mounted to computer housing 14 utilizing attachment mechanism 18 illustrated and described in association with first embodiment of FIGS. 1–3. As shown in FIG. 4a, Storage unit assembly 10' includes a storage attachment device 40, which is a shelving unit having a plurality of horizontal shelves 42 positioned therein for supporting various objects, and would particularly be suitable for computer manuals, instruction booklets, or office items such as disks, tapes, staplers, and the like. Similarly, FIG. 4b illustrates a storage unit assembly 10" having a storage attachment device 44 with shelves 46 which are oriented at an angle, preferably in the range between 30° and 60° and more preferably at 45°, for receiving therein items such as file folders, computer printouts, and other objects for ease of user access. The embodiments disclosed in FIGS. 4a and 4b are also particularly useful in an office or home setting where a computer or printer has multiple users, so that papers and printing jobs which are left in a work area may be placed on the shelves 42 and 46 for storage until they are picked up by their owner, and are therefore kept off of the desk or printer until they are claimed by a user.

FIGS. 5–8 illustrate a fourth embodiment of a storage device unit assembly 50 for attachment to computer tower housing 14. As shown in FIGS. 68, storage device unit assembly 50 includes a storage device 51 defining a compartment therein. Storage device 51 is mounted to housing 14 and is disposed above top panel 15. Device 50 has a bottom surface 52 (main panel) and two pairs of opposing side walls 54, 56 and 58, 60 extending upward in a perpendicular orientation from bottom surface 52. As is best shown in FIG. 5, bottom surface 52 has a pair of apertures 61 extending therethrough. Apertures 62 are shown in FIG. 5 as a pair of counterbored holes but of course may be any design capable of performing the desired functions and objectives according to the present invention.

A pair of mounting portions 64 and 66 each have a vertically aligned panel member 65 and 67, respectively, for mounting to tower housing 14 adjacent sides 17 and 19. Further, mounting members 64 and 66 each have a transverse portion 68 and 70, respectively. Each transverse portion 68, 70 is oriented perpendicular to panels 64 and 66 for positioning storage device 51 adjacent upper surface 15 of tower 14 during use and operation. Each transverse portion 68, 70 also includes an aperture 62, shown in FIG. 5 as transverse slots 62 extending therethrough. Storage unit assembly 50 also includes a plurality of resting portions 72 (or stabilizer members/feet) disposed on the lower surface 74 of bottom 52, for supporting and providing stability to assembly 50.

Mounting attachments 64, 66 in conjunction with slots 62, holes 61, and a connecting member 63 allow mounting attachments to be adjustably mounted to various sizes of housing 14, whereby the mounting attachments may be moved in an inward and an outward direction relative to device 51. More particularly, as illustrated in FIG. 5, a member 63 (such as a pin, screw, or the like) is inserted through hole 61 and slot 62, thereby connecting storage portion 51 to mounting members 64, 66. The length of slot 62 thus allows for members 64, 66 to move inward and outward relative to storage device 51. If member 63 is a threaded member such as a bolt, a corresponding nut (not shown) may be mounted to member 63 on the lower surface of mounting members 64, 66 in order to secure device 51 to members 64, 66.

Figure 7:
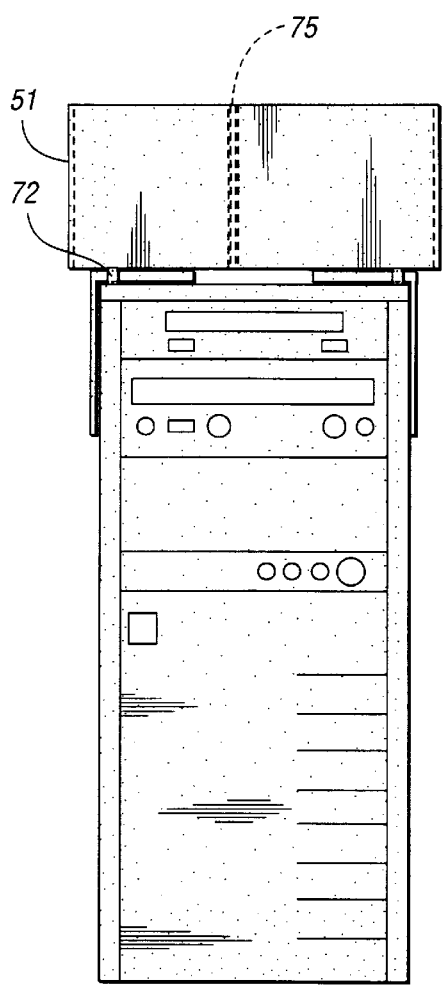
FIG. 7 is a front elevational view of the fourth embodiment shown in FIG. 5.
Figure 8:
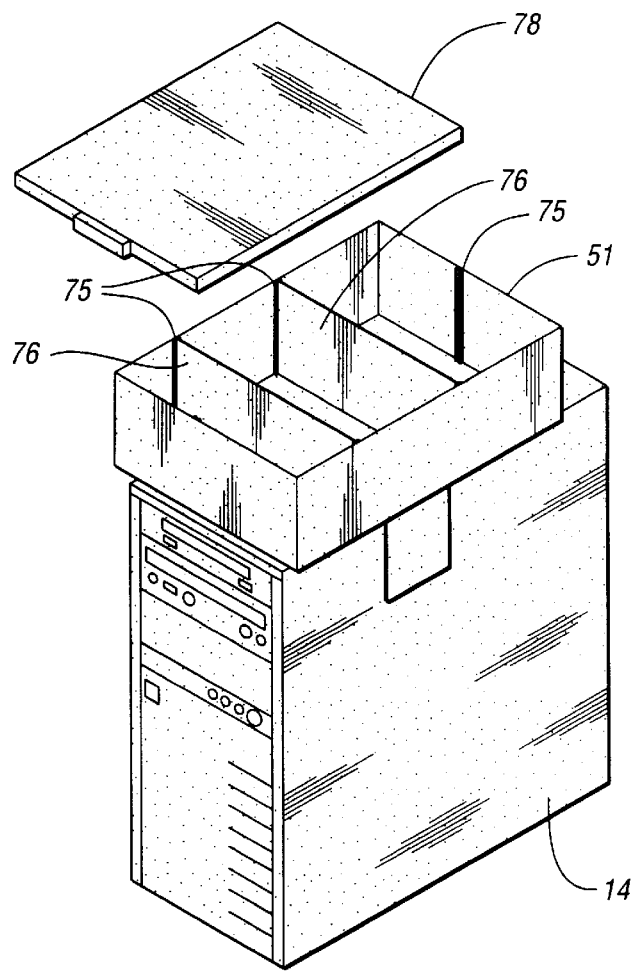
FIG. 8 is a perspective view of the fourth embodiment with the storage attachment device having dividing members installed therein.

FIG. 7 illustrates a front view of the embodiment shown in FIGS. 5–6. FIG. 8 illustrates the embodiment of FIGS. 5–7 and particularly showing divider panels 76 which are received in corresponding grooves 75 of device 51 in order to separate various compartments for the placement and organization of objects therein. Note that the perspective views of both FIGS. 6 and 8 show that storage unit assembly may also include a lid 78 or cover for enclosing device 51 and for protecting the contents within. Lid 78 is adapted to be disposed on top of device 51 and may form a loose attachment or a secure attachment, such as by a snap fit. Further, it is fully contemplated that lid 78 may attach to device 51 by various methods known in the art, including but not limited to being pivotably attached thereto as shown in later embodiments.

Figure 9C:
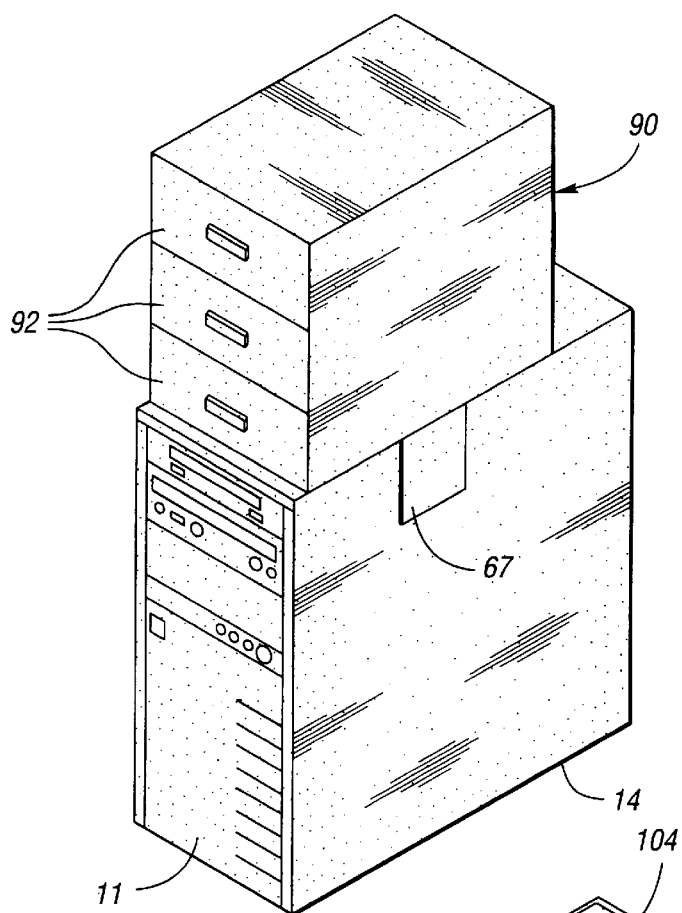
FIG. 9c illustrates a perspective view of a seventh embodiment of the storage attachment device according to the present invention having pull-type drawers directed toward the front of the computer housing.

FIGS. 9a, 9b, and 9c illustrate further embodiments of the storage device shown in FIGS. 5–8 and according to the present invention. FIGS. 9a, 9b, and 9c show as storage devices 80, 80', and 90, respectively. Storage devices 80, 80', and 90 are preferably attached to housing tower 14 via similar means to that disclosed in association with FIG. 5, but of course may be attached in any manner in accordance with the teachings of the present invention. FIG. 9a illustrates a storage device 80 having shelves 82 open toward side 17 of housing 14. FIG. 9b, on the other hand, illustrates a storage device 80' as a shelving unit having shelves 82' oriented toward a front panel 11 of housing 14. FIG. 9c presents storage device as 90 as a unit disposed on an upper portion of housing 14 and having drawers 92 oriented toward a front 11 of housing 14. Thus, drawers 92 may be pulled out disclosing areas for storing items contemplated by the present invention.

Figure 10A:
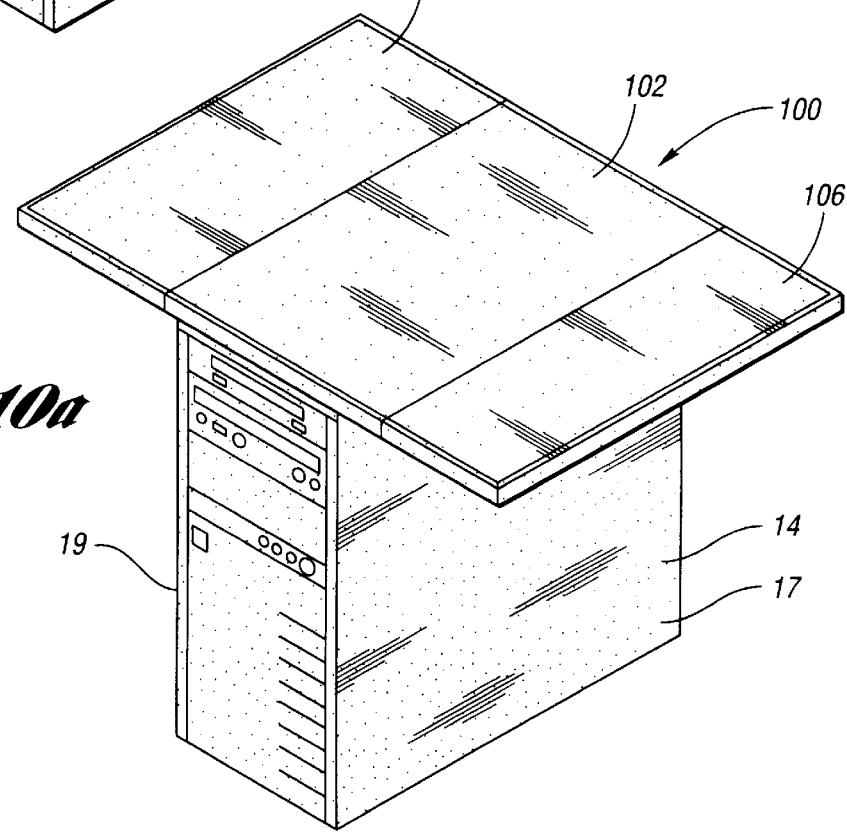
FIG. 10a illustrates an eighth embodiment of the storage attachment mechanism according to the present invention having a planar storage surface.
Figure 10B:
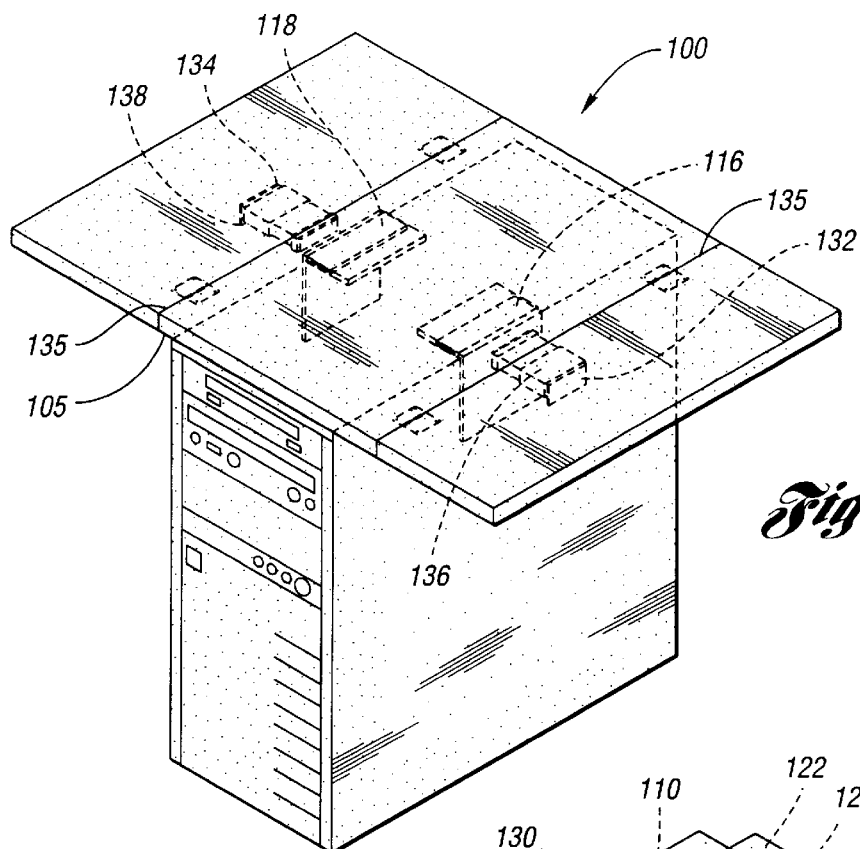
FIG. 10b is a perspective view of the eighth embodiment showing the attachment mechanism and attachment surface folding mechanisms in phantom.
Figure 11:
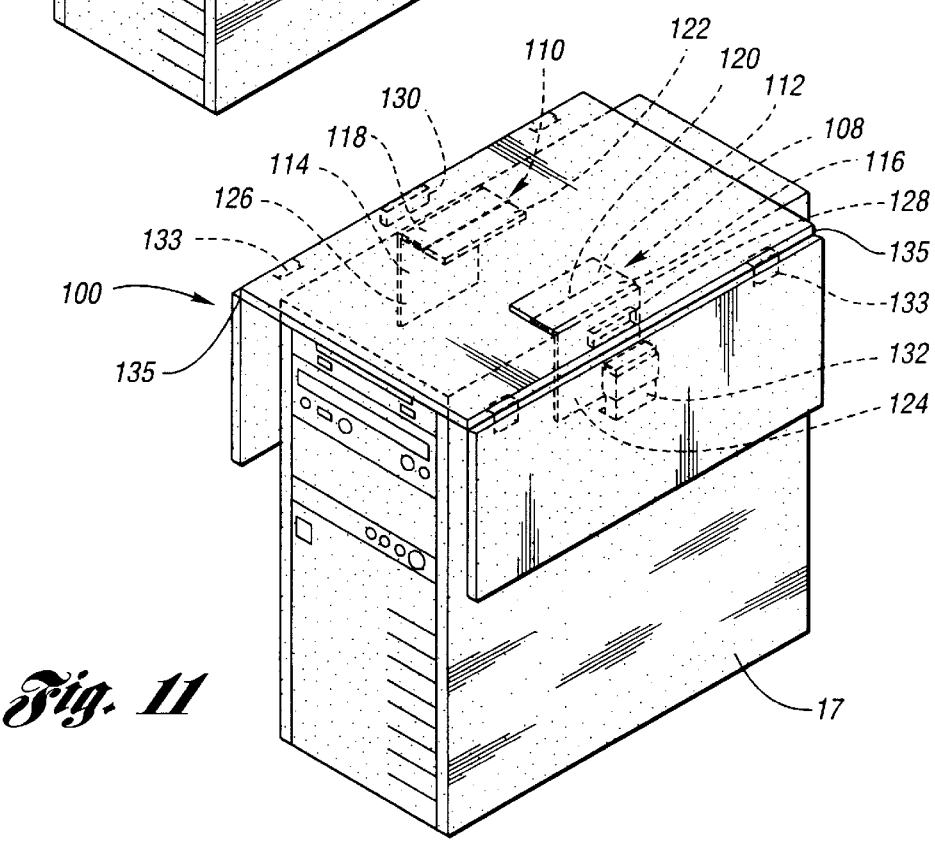
FIG. 11 is a perspective view of the eighth embodiment shown in FIGS. 10a and 10b according to the present invention having the attachment surface side members in a folded orientation.

With reference now to FIGS 10a, 10b and 11 of the drawings, shown therein is another embodiment of a storage attachment device 100 according to the present invention for assembly with computer tower housing 14. As illustrated in FIGS. 10–11, attachment device 100 which preferably is oriented horizontally, and which is attached to the upper portion of housing 14. Attachment 100 also preferably has a central portion 102 (main panel) and two side portions 104, 106 (opposing walls) which extend outward and project beyond sides 19 and 17 of housing 14. Either or both of side portions 104 or 106 may fold downward in relation to central portion 102, as shown and described in association with FIG. 11.

Also included in assembly 100 is a pair of attachment and folding mechanisms 108, 110 which are illustrated in phantom in FIGS. 10b and 11. Particularly as shown therein, attachment and folding mechanisms 108, 110 each includes a pair of mounting bracket portions 112 and 114, respectively, which, as is disclosed in association with previous embodiments, straddle the upper portion of tower housing 14 and are adjustable to accommodate various ranges and sizes of housing 14. As best shown in FIG. 10b and FIG. 11, attachment and folding mechanism 108, 110 each includes a pair of channel brackets 116 and 118, respectively, which are disposed on the lower surface 105 of central portion 102 and slidingly receive transverse portions 120 and 122, respectively, of mounting bracket portions 112, 114, thereby allowing mounting bracket portions 112, 114 to move in an adjustable manner in an outward and inward direction relative to tower 14. Also, mounting portions 112 and 114 each have a vertically oriented panels 124, 126 for securing and holding storage device assembly 100 adjacent and secure to tower sides 19 and 17.

Another set of brackets 128, 130 is disposed on lower surface 105 of central portion 102 for slidingly receiving therein a movable locking member 132, 134. As shown in FIG. 11, when side panels 104 and 106 are folded downward via a plurality of hinge members 133 (four are shown), each locking member 132, 134 is removed from (i.e., not inserted in) aperture 128, 130 (see also FIG. 10b). However, with reference to FIG. 10b, in order to lock side panels 104 and 106 into a planar horizontal orientation, they are folded upward (from their position in FIG. 11) via hinges 133 until the range of hinge motion stops and side panels 104 and 106 are substantially parallel with center panel 102. Then, each locking member 132, 134 is slidingly inserted into its respective aperture 128, 130 by extending it across the fold lines 135, to maintain folding side members 104 and 106 in the planar horizontal orientation. Each locking member 132, 134 is supported by a bracket 136, 138 in which it slides (see FIG. 10b). Each bracket 136, 138 is mounted to the lower surface of panels 104 and 106, respectively.

Figure 12A:
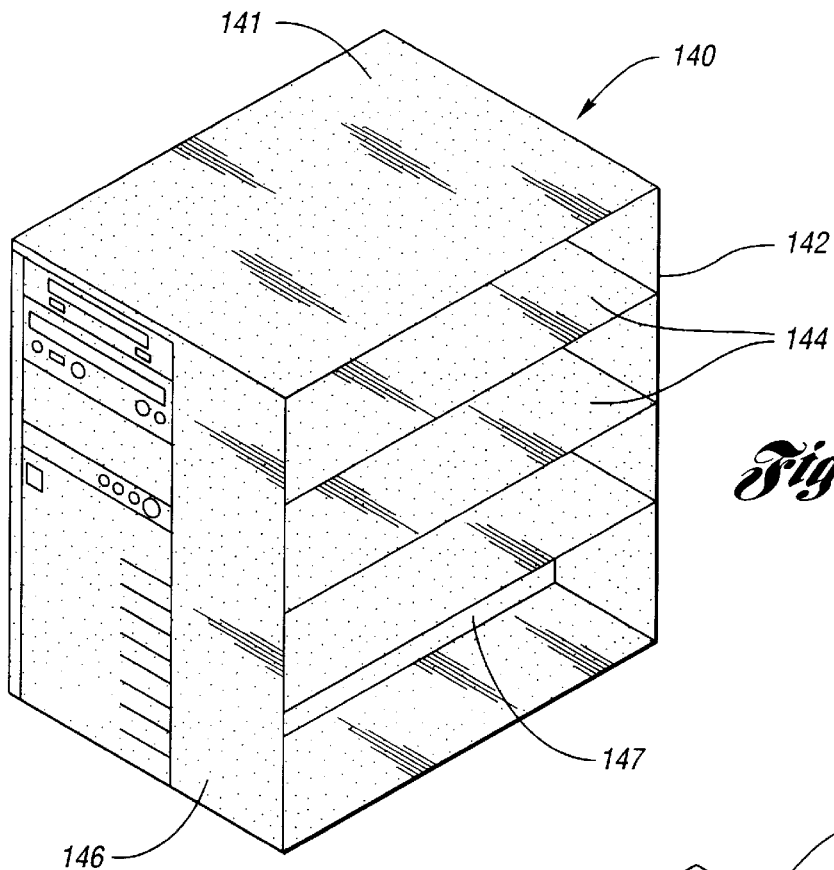
FIG. 12a illustrates a ninth embodiment according to the present invention having the storage member integrally molded with the computer tower housing, such storage oriented on a side of the housing.
Figure 12B:
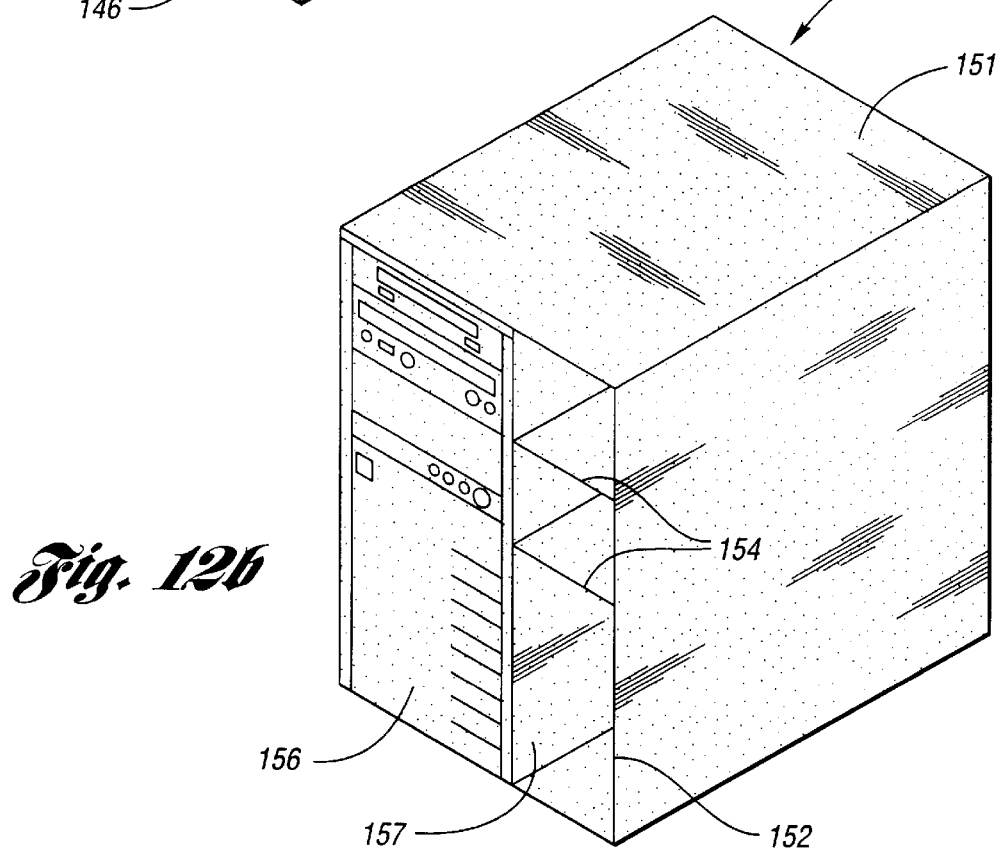
FIG. 12b is tenth embodiment of the storage compartment integrally molded with the computer tower housing having shelving directed towards a front of the computer tower housing.

With reference to FIGS. 12a and 12b, illustrated therein are different embodiments of computer tower housing 140 and 150, respectively, according to the present invention. With focus on FIG. 12a, computer tower housing 140 includes a storage portion 142 integrally molded therein. In this embodiment, storage portion 142 includes a plurality of shelving members 144 similar to that disclosed in the embodiment associated with FIG. 4a. Shelving members 144 are oriented substantially parallel to top surface 141 of housing 140 and are open toward a side of housing 140 and away from front panel 146. Shelving members 144 are also shown oriented perpendicular to a main panel 147 of housing 140. Again, such design allows for ease of access to manuals, reference books, papers as well as typical office supplies such as staplers, tape dispensers, hole punchers, as well as picture frames, etc., and the like. Furthermore, depending on the size of the shelving members 144, it is contemplated that a printer, such as a laser or ink jet printer, could be placed on shelving members 144 for convenience, space savings and ease of access by the user.

FIG. 12b illustrates an alternative embodiment of a computer tower housing 150 having a storage portion 152 integrally molded therein. Storage portion 152 includes shelving members 154 oriented and open toward a front panel 156 of housing 110. These shelving members are also oriented substantially parallel to top surface 151 of housing 150. Of course, depending on the weight of the object placed on shelving members 144, 154, it is contemplated that housing portion 140, 150 is capable of countering the given weight of storage portions 142, 152 so that housing 140, 150 does not tip over. Of course, it is fully contemplated that shelving members 144, 154 may be oriented at an angle similar to that shown in FIG. 4b. Like the previous embodiment, housing 150 also includes a main panel 157 serving as disposed adjacent shelving members 154.

Figure 13A:
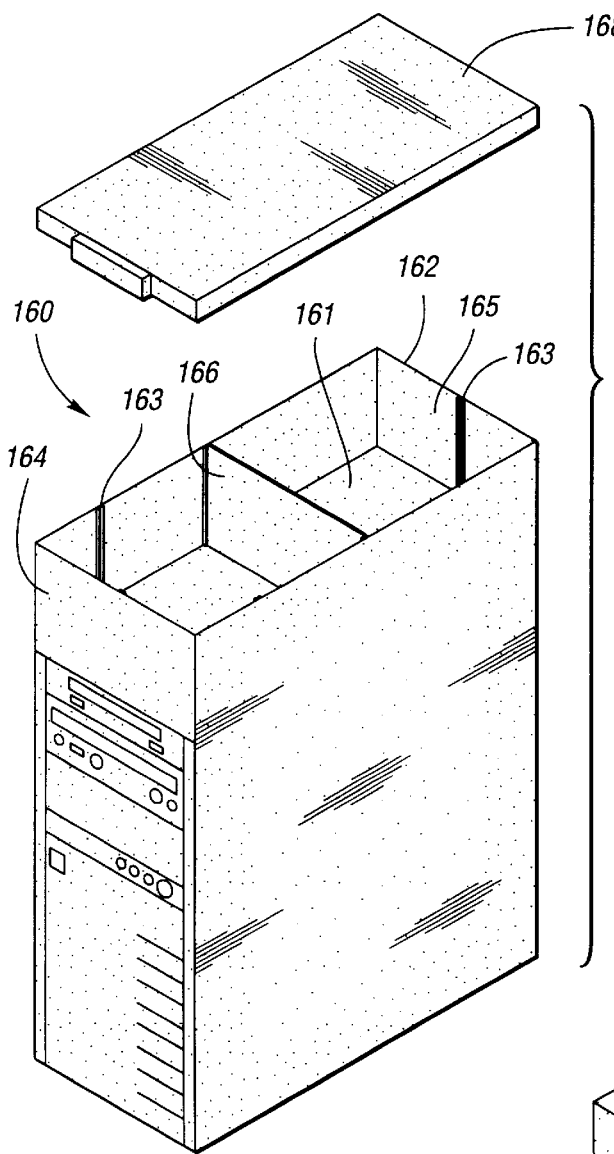
FIG. 13a shows an eleventh embodiment of the storage attachment molded integrally with the computer housing and open towards a top of the computer housing, and showing a lid for the storage compartment spaced therefrom.

FIG. 13a illustrates yet another computer tower housing 160 having an integrally molded storage portion 162. Particularly, storage portion 162 is integrally molded to an upper portion 164 of housing 160. Storage portion 162 has an opening which is oriented in an upward manner so that its compartment 165 may be top loaded. As with previous embodiments, storage portion 162 includes divider receiving portions 163 for receiving one or more divider panels 166 in a sliding manner in order to separate compartment 165 of storage portion 162 into smaller compartments. A lid 168 is also provided for placement on computer tower housing 160. Lid 168 provides a barrier between storage portion 162 and the environment. For example, lid 168 would prevent dust from settling on objects placed in compartment 165, such as floppy discs or CD-ROMS. Note that housing 160 includes a main panel 161 as a lower support for any contents stored therein.

Figure 13B:
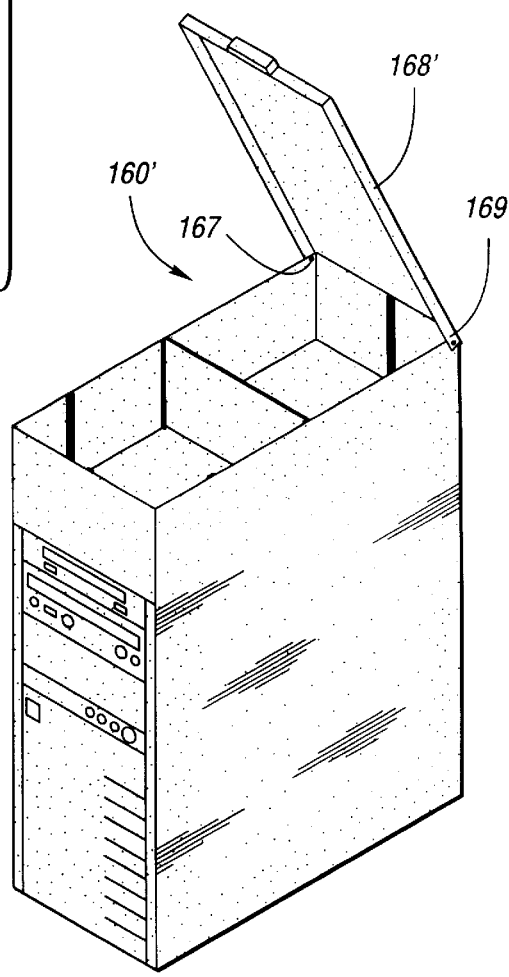
FIG. 13b shows the embodiment of FIG. 13a wherein the lid portion is pivotably attached to the computer tower housing.

FIG. 13b illustrates a similar design to that disclosed in FIG. 13a, with the addition that lid 168' is pivotably attached to tower housing 160', the attachment means in FIG. 13b shown as a hinge portion 167, and more particularly pins 169 which attach lid to housing 160' on each side of housing 160'.

Figure 14:
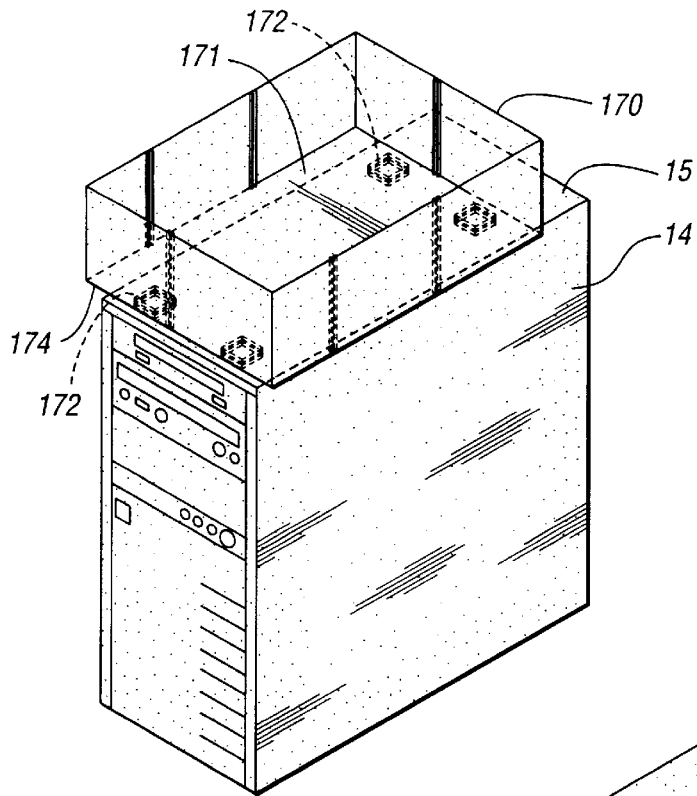
FIG. 14 is another embodiment of the storage attachment according to the present invention, wherein the attachment mechanism to the computer tower housing is shown in phantom.

FIG. 14 illustrates another embodiment of the storage device according to the present invention. Storage device 170 is disposed on an upper portion of housing 14, and particularly on the top panel 15 of housing 14. Storage device 170 is a separate member mechanically fastened to or engaged with tower 14. With reference to FIG. 14, it is illustrated that storage member 170 is attached to panel 15 of housing 14 via one or more hook and loop type fasteners, such as Velcro™ portions 172, wherein one of the hook and loop is attached (such as by an adhesive backing or other feasible methods) to a lower surface 174 of the bottom panel 171 (main panel) of storage portion 170, while the other of the hook and loop is attached to top panel 15 of housing 14 in a similar manner. The hook and loop portions are then brought into contact with each other in order to provide a secure attachment between storage member 170 and housing 14.

Figure 15:
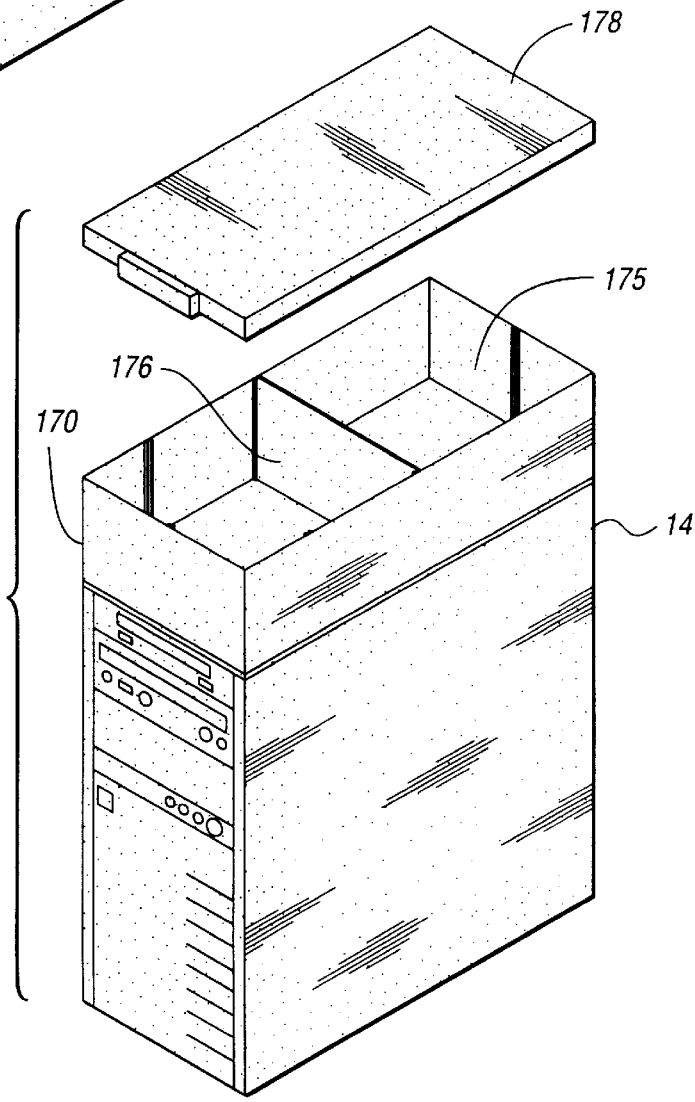
FIG. 15 shows a computer tower having attached thereto the storage attachment embodiment of FIG. 14 according to the present invention.

FIG. 15 shows the embodiment of storage device 170 in operation, having a lid portion 178 and dividers 176 in its storage compartment 175. Lid portion 178 and dividers 176 may be attached to storage device 170 in any manner similar to, consistent with, and contemplated by those shown and disclosed in previous embodiments.

Figure 16:
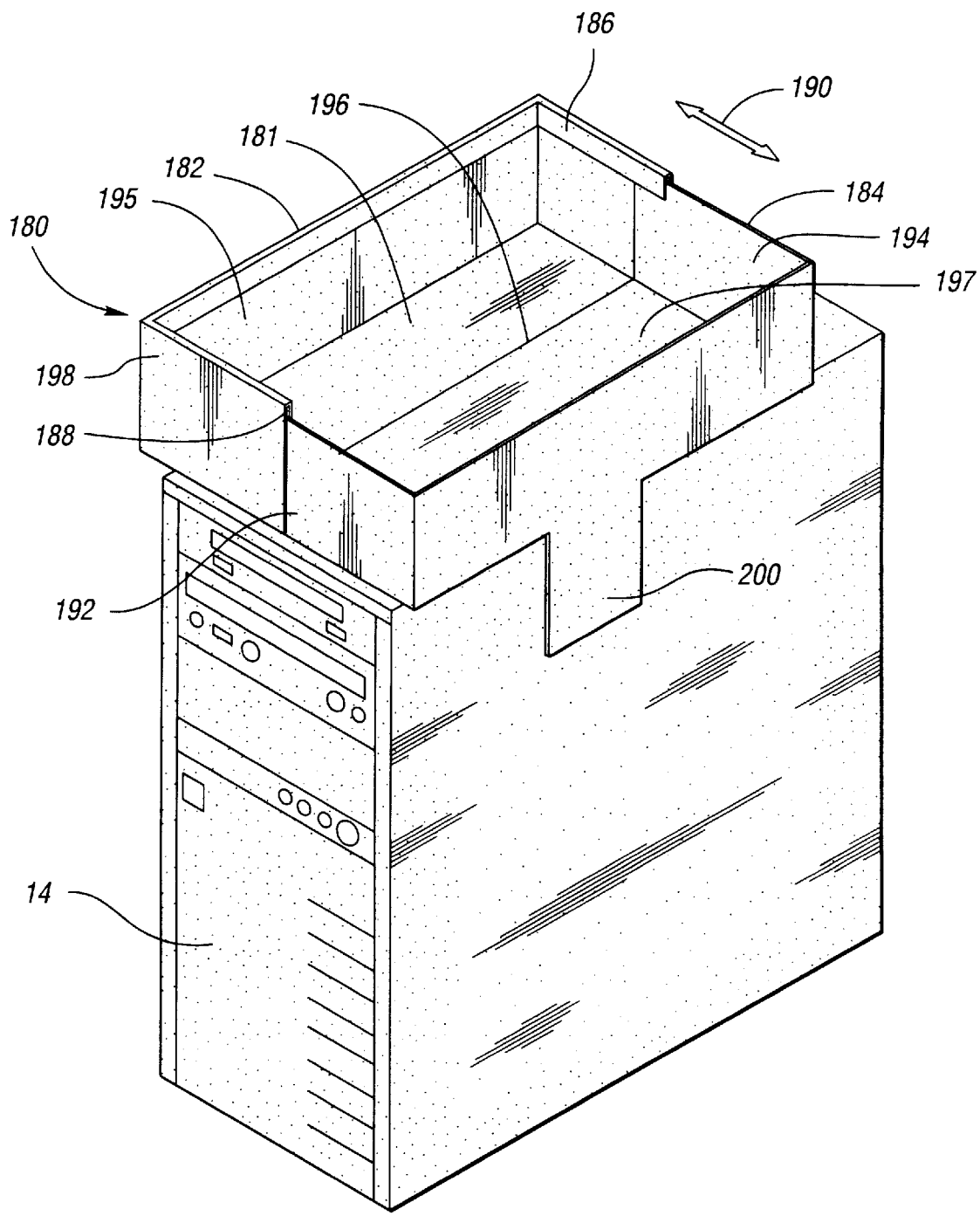
FIG. 16 is still another embodiment of the storage attachment which includes a first member which telescopingly receives a second member.

FIG. 16 illustrates another embodiment of a storage device 180 according to the present invention. Storage device 180 includes a first portion 182 and a second portion 184. As illustrated therein, first portion 182 telescopically receives second portion 184. More particularly, first portion 182 includes a double wall portion 186 defining an opening 188 therebetween, such that as second portion 184 is moved transversely inward and outward (in the directions shown by arrow 190), side walls 192, 194 of second portion 184 are slidingly received in the corresponding portion of opening 188 of first portion 182, so that portions 182 and 184 are attached and coupled to each other. Note that second portion 184 is inwardly defined by edge 196.

The attachment members 200 are shown integrally attached (molded) with storage device 180, since their independent transverse movement is not necessary, given that first portion 182 and second portion 184 transversely move and telescope in order to provide accommodate various sizes of computer tower 14. Note also that first portion 182 has a first bottom main panel portion 195 and that second portion 184 has a second bottom main panel portion 197 which together serve to define a bottom panel 181, when portions 182 and 184 are attached to each other.

Of course, the invention contemplates that second portion 184 may be moved sufficiently transversely outward from opening 188 and away from first portion 182 that it becomes separable from first portion 182. This separation of portions 182, 184 may be convenient, for example, when transporting or packaging storage device 180. It is similarly contemplated that storage device 180 or any portion thereof, may include a stop member in order to prevent the complete separation of first portion 182 and second portion 184. Also, note that while double wall portion 186 is illustrated as only a partial height portion relative to the entire wall height (for example of wall 198) of first portion 182, double wall portion 186 may just as easily extend the entire wall height of first portion 182, or may also be a relatively small lip which defines opening 188, for telescopingly receiving second portion 184 therein.

Of course, it is contemplated that any of the previous designs disclosed herein or contemplated according to the previous invention may be attached via any of the methods and means disclosed and contemplated according to the present invention. Thus, the storage members and portions disclosed according to the present invention provide a convenient storage area near a user's computer at both the office and at home, or wherever such convenient storage may be necessary.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage assembly for mounting to a computer tower housing having a main mounting panel and a pair of side mounting panels oriented perpendicular to the main mounting panel, the storage member assembly comprising:

a main panel member having a lower surface oriented adjacent the mounting panel of the computer tower housing and having a attachment member disposed thereon;

a pair of side panels members pivotably attached to the main panel member and defining a fold line therebetween, the pair of side panels orientable in a first locked orientation wherein each of the side panel members are co-planar with the main panel member and a second unlocked orientation wherein the side panel members are folded pivotably at an angle from the main panel member; and a pair of mounting members each having a side portion disposed adjacent a corresponding side mounting panel of the computer tower housing, and a main portion disposed adjacent the main mounting panel of the computer tower housing and slidably received within the attachment member on the main panel member for adjustably positioning the pair of mounting members relative to the computer tower housing.

2. The storage assembly of claim 1 wherein each of the pair of side panels has an aperture disposed therein such that, in the first locked orientation, the aperture slidingly receives a corresponding locking member which is attached to each of the at least one pair of opposing walls and extends across the fold line for maintaining the pair of side panels in a co-planar orientation.

\* \* \* \* \*